United States Patent
Anders

[11] 3,762,748
[45] Oct. 2, 1973

[54] LINKAGE CONNECTING MEANS
[75] Inventor: Larry E. Anders, Palm Springs, Fla.
[73] Assignee: United Aircraft Corporation, East Hartford, Conn.
[22] Filed: June 30, 1972
[21] Appl. No.: 267,820

[52] U.S. Cl. .......................... 403/156, 280/515
[51] Int. Cl. ............................................ F16c 11/06
[58] Field of Search ........................ 287/88, 100; 280/515, 507; 85/5 CP

[56] References Cited
UNITED STATES PATENTS
2,654,613 10/1953 Blair et al. ................................ 280/515
2,827,317 3/1958 Saulnier ................................ 287/100

FOREIGN PATENTS OR APPLICATIONS
737,232 9/1955 Great Britain ...................... 280/515
235,369 9/1961 Australia ........................... 280/515

Primary Examiner—Andrew V. Kundrat
Attorney—Jack N. McCarthy

[57] ABSTRACT

A linkage connecting means for interconnecting two members having aligned openings through which a pin is located. A pin holding member is pivotally attached to one of said members and is movable to a position engaging said pin to hold it in position and prevent it from rotating. A nut is placed on the threaded end of a projection extending through the pin holding member and is tightened against the bottom of the holding member.

4 Claims, 4 Drawing Figures

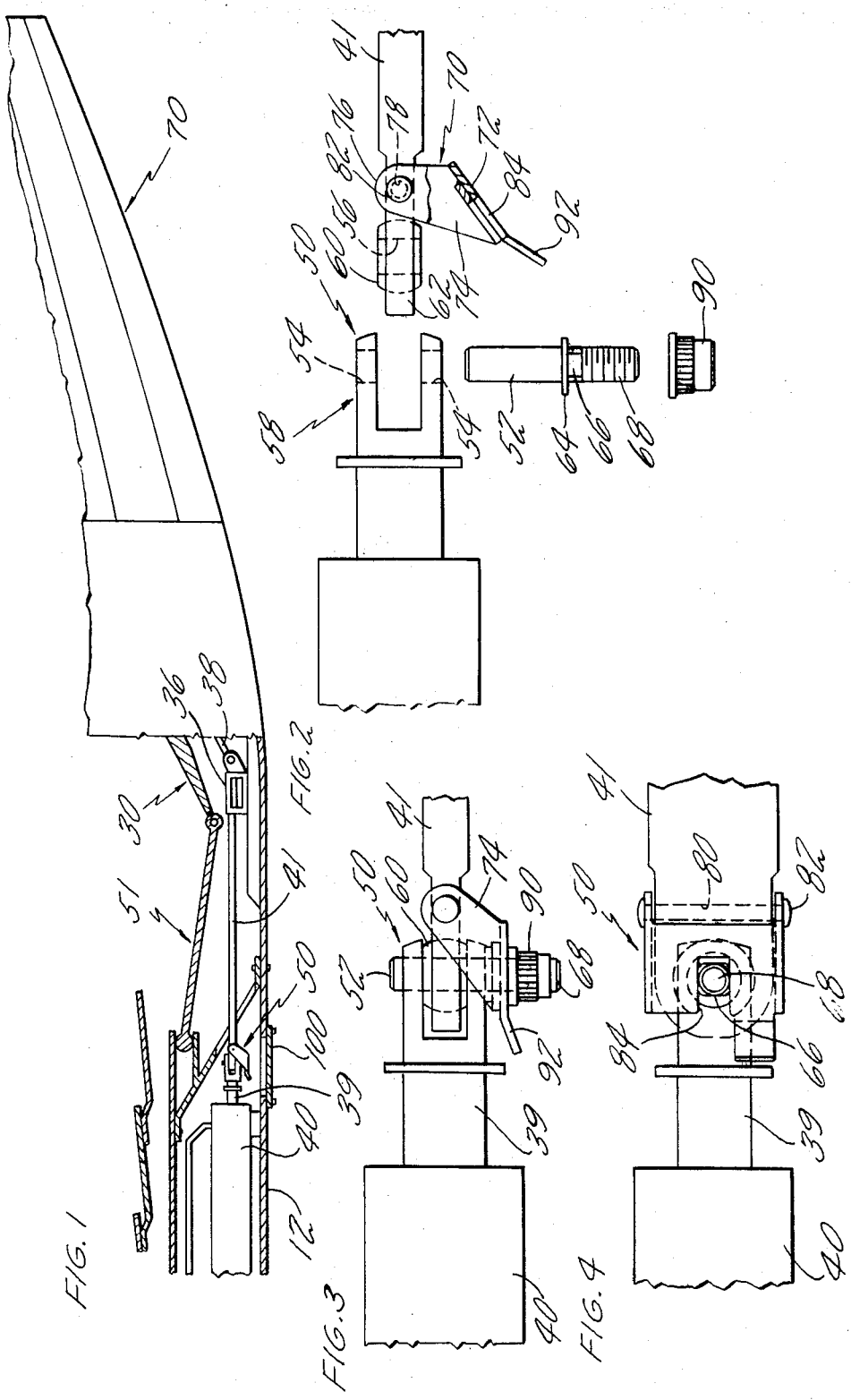

LINKAGE CONNECTING MEANS

The invention described herein was made in the course of or under a contract with the Department of the Air Force.

BACKGROUND OF THE INVENTION

This invention relates to a linkage connecting means or pins type joint which is generally known in the prior art. However, no prior art reference shows an arrangement such as set forth hereinbelow.

SUMMARY OF THE INVENTION

A primary object of the present invention is to provide an improved linkage connecting means wherein forces can be transmitted through the linkage and the connecting means can be easily locked in position.

In accordance with the present invention a pin member is fixedly held in place by a pin holding member which is pivotally attached to one of the members being connected.

Another object of this invention is to provide a linkage connecting means which is easily accessible and can be connected or disconnected from one side thereof. A further object of the invention is to provide a linkage connecting means which will not place any force on the pin holding, or retaining, member.

BRIEF DESCRIPTION OF THE DRAWINGS

FIG. 1 is a view illustrating the application of the invention to the actuating rod of a nozzle on a turbojet engine.

FIG. 2 is an enlarged exploded view of a linkage connecting means incorporating the invention.

FIG. 3 is an enlarged side view of the linkage connecting means.

FIG. 4 is a bottom view of the linkage connecting means.

DESCRIPTION OF THE PREFERRED EMBODIMENTS

Referring to FIG. 1 a cylinder and piston unit 40 is shown connected to an outer engine housing structure 12. The actuating rod 39 of the cylinder and piston unit 40 is connected by a linkage connecting means 50 to an actuating rod 41 which is in turn connected to a unison ring 36. The unison ring 36 is connected to flap actuating arms (not shown) by rings 38. The flaps are partially shown at 51, 30 and 70. This precise nozzle construction is shown in U. S. application Ser. No. 209,665 filed Dec. 20, 1971. Further description of the nozzle construction is also shown in U. S. application Ser. No. 209,664 filed Dec. 20, 1971.

The linkage connecting means 50 includes a pin 52 which is inserted through openings 54 and opening 56 of the actuating rod 39 and actuating rod 41, respectively. The openings 54 are located in the end of the actuating rod 39 which is bifurcated as shown at 58. The holes 54 are aligned and their axis is at 90° to the center line of the actuating rod 39. Opening 56 is located in a ball member 60 which is mounted for movement at the mating end 62 of the actuating rod 41. This movement of the ball member 60 with the end 62 provides for small misalignment or angular movement between the actuating rod 39 and actuating rod 41.

The pin 52 is of such a length to extend through the openings 54 and 56 and has an annular flange 64 which meets with the actuating rod 39 to position the pin. On the other side of the flange 64 a projection is formed having a short section 66 of squared cross-section and a threaded end portion 68.

A pin holding member 70 is pivotally mounted to the actuating rod 41 adjacent the ball member 60 on the side thereof opposite from the free end. The pin holding member 70 is comprised of a flat rectangular portion 72 with two projecting members 74 and 76. The members 74 and 76 have aligned openings 78 therein, which are placed by an opening 80 in the free end of the actuating rod 41 and a pin 82 is positioned through the hole 78 and 80 to pivotally mount the pin holding means 70.

The rectangular portion 72 is formed with a flat-sided notch 84 at the center thereof aligned to be rotated into alignment with the openings 54 and 60 so as to encircle the short section 66, in its position as shown in FIG. 3, with the flat sides of the notch 84 engaging two sides of the squared cross-section. In this position a nut 90 is threadably mounted on the threaded end portion 68 and moved to a position where it abuts the bottom of the rectangular member 72. The connecting means is then in position to function, and delivers a transmitting force through both of the actuating rods 39 and 41 in either direction.

A tab 92 projects from one side of the rectangular member 72 for use in opening the connecting means 50 when it is desired to disconnect the actuating rods 39 and 41. A removable plate 100 is provided in the engine housing structure 12 adjacent the location of each linkage connecting means 50 so that they will be easily accessible and easy to connect or disconnect.

I claim:

1. A connecting means between two members having aligned openings, a pin means adapted to project into said aligned openings, said pin means having an abutment for locating the pin in said openings, said pin having means projecting from the opposite side of said abutment, said means projecting including a short section of flat-sided cross-section adjacent said abutment and an extension therefrom which is threaded, a pin holding member being pivotally attached to one of said members, said pin holding member having a flat-sided notch therein for mating with said short section of flat-sided cross-section on said pin, a nut for threadable engagement with said threaded extension to fixedly position said holding member and thereby fixedly position said pin in said openings when said flat-sided notch is around said short section of flat-sided cross-section.

2. A connecting means as set forth in claim 1 wherein said flat-sided cross-section is square.

3. A connecting means as set forth in claim 1 wherein said pin holding member has a tab thereon for manually pivoting said member.

4. A connecting means as set forth in claim 1 wherein one of said aligned openings is formed in a ball member, said ball member being mounted to provide for a change in angular positions between said two members having aligned openings.

* * * * *